(12) United States Patent
Newman (10) Patent No.: US 11,762,175 B2
(45) Date of Patent: Sep. 19, 2023

(54) METHODS AND APPARATUS FOR SEAMLESS TRANSITIONS BETWEEN LENS PROJECTIONS

(71) Applicant: GoPro, Inc., San Mateo, CA (US)

(72) Inventor: David A. Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 476 days.

(21) Appl. No.: 17/079,300

(22) Filed: Oct. 23, 2020

(65) Prior Publication Data

US 2021/0124155 A1 Apr. 29, 2021

Related U.S. Application Data

(60) Provisional application No. 62/925,143, filed on Oct. 23, 2019.

(51) Int. Cl.
| | |
|---|---|
| *G02B 13/16* | (2006.01) |
| *G02B 3/08* | (2006.01) |
| *H04N 23/698* | (2023.01) |

(52) U.S. Cl.
CPC ............... *G02B 13/16* (2013.01); *G02B 3/08* (2013.01); *H04N 23/698* (2023.01)

(58) Field of Classification Search
CPC .......... G02B 13/16; G02B 3/08; G02B 13/06; H04N 23/698; G06T 3/0062
See application file for complete search history.

(56) References Cited

U.S. PATENT DOCUMENTS

2017/0034410 A1* 2/2017 Yoo ...................... H04N 23/632

\* cited by examiner

*Primary Examiner* — James C. Jones
(74) *Attorney, Agent, or Firm* — ESPLIN & ASSOCIATES, PC (57) ABSTRACT

Methods and apparatus for seamlessly transitioning between lens projections. In one exemplary embodiment, a piecewise lens projection is composed of three (3) functions: (i) a first polynomial-based lens projection, (ii) a second "joining" lens projection, and (iii) a trigonometric lens projection. The piecewise lens projection characterizes virtualized lens distortion as a function of FOV; image data can be dynamically projected based on the virtualized lens distortion, regardless of FOV. In this manner, a user may achieve the visually familiar effects associated with a first lens definition for a first FOV, while still smoothly animating transitions to other lens projections (e.g., a larger FOV using stereographic projections).

20 Claims, 5 Drawing Sheets

METHODS AND APPARATUS FOR SEAMLESS TRANSITIONS BETWEEN LENS PROJECTIONS

PRIORITY

This application claims the benefit of priority to co-owned and co-pending U.S. Patent Application Ser. No. 62/925,143 filed Oct. 23, 2019 and entitled "METHODS AND APPARATUS FOR SEAMLESS TRANSITIONS BETWEEN LENS PROJECTIONS", which is incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

This disclosure relates to media editing. Specifically, the present disclosure relates in one exemplary aspect to the definition and display of wide-angle media via lens projections.

Description of Related Art

In the photographic arts, the field of view (FOV) (or angle of view) is the part of the world that is captured by the camera at a particular position and orientation in space. Typical, "point and shoot" cameras have a FOV of ~60°; "wide angle" photography refers to photography that exceeds a FOV of 60°; for example, action cameras (such as the GoPro HERO™ or Fusion™ families of devices manufactured by the Assignee hereof) can capture 360° spherical content (e.g., pictures and video.)

Digital post-processing techniques provide consumers with a myriad of image editing effects. As but one example, images can be re-projected (e.g., stretched, shrunk, warped) so as to impart various aesthetic perspectives, etc. As another example, panoramic images from multiple cameras can be "cropped" (cut) and stitched together to focus on a particular object of interest. Modern image editing techniques may enable users to create images and video that exceed the physical capabilities of single lens camera photography.

SUMMARY

The present disclosure provides, inter alia, methods and apparatus for seamlessly transitioning between lens projections.

In one aspect, methods and apparatus configured to enable seamless transitions between lens projections are disclosed. In one exemplary embodiment, the method includes: obtaining a plurality of lens projections; generating a hybrid lens projection based on the plurality of lens projections; obtaining image content to project; selecting a field of view; projecting the image content based on the field of view and the hybrid lens projection; and formatting the image content for consumption.

In one variant of the method, the plurality of lens projections are each associated with one of (i) a polynomial-based lens curvature or (ii) a trigonometric lens curvature.

In another variant, the projecting of the image content includes modifying a dimension associated with at least one extent of the projected image content.

In yet another variant, the method further includes: causing the formatted image content to be encoded via implementation of a codec chain; and subsequent to the implementation of the codec chain, causing transfer of the encoded image content to a computerized apparatus.

In a further variant, the generating of the hybrid lens projection includes generating a first lens projection, a second lens projection, and at least one intermediary lens projection therebetween, each of the first, second, and intermediary lens projections being defined as a function of a field of view.

In still another variant, the method further includes dynamically determining the at least one intermediary lens projection based at least on a smoothing between a slope of the first lens projection and a slope of the second lens projection.

In another variant, the method further includes dynamically determining the at least one intermediary lens projection based at least on a user selection or an automatic selection from a plurality of options.

In a related aspect, an apparatus configured to perform the foregoing techniques are described. In one exemplary embodiment, the apparatus may include a processor, and a non-transitory computer-readable medium comprising one or more instructions which when executed, cause the apparatus to: generate a hybrid lens projection based on the plurality of lens projections; obtain image content to project; select a field of view; project the image content based on the field of view and the hybrid lens projection; and format the image content for consumption.

In another embodiment of the foregoing apparatus, the apparatus includes: a processor apparatus; a first image-capture apparatus and a second image-capture apparatus; and a non-transitory computer-readable apparatus including a storage medium, the storage medium including a plurality of instructions configured to, when executed by the processor apparatus, cause the computerized apparatus to at least: cause a first image to be captured; cause a second image to be captured; produce a spherical image content; determine a hybrid lens projection; and generate an image projection.

In one variant of the foregoing apparatus, the plurality of instructions are further configured to, when executed by the processor apparatus, cause the computerized apparatus to at least determine a field of view associated with the image projection of the spherical image content.

In one implementation of the foregoing apparatus, the generation of the image projection of the spherical image content is further based at least on the determined field of view.

In another variant of the foregoing apparatus, the plurality of instructions are further configured to, when executed by the processor apparatus, cause the computerized apparatus to at least enable a user of the computerized apparatus to select one of the first lens projection or the second lens projection.

In one implementation, the generation of the image projection of the spherical image content is further based at least on the selection of the first or second lens projection.

In another variant, the field of view is configured to be dynamically modified; and the generation of the image projection of the spherical image content is further based at least on the dynamic modification of the field of view.

In another variant, the first lens projection is based on a polynomial-based function; and the second lens projection is based on a trigonometric-based function.

In yet another variant, the first image captured via the first image-capture apparatus includes a first hyper-hemispherical image; the second image captured via the second image-capture apparatus includes a second hyper-hemispherical image; and the first and second hyper-hemispherical image include one or more overlapping regions with respect to each other.

In a further variant, the hybrid lens projection includes a third lens projection that is different from the first and second lens projections, the third lens projection being configured to provide a transition between a slope associated with the first lens projection and a slope associated with the second lens projection, the transition being configured to create fewer image artifacts within the image projection of the spherical image content as compared to an image projection without the hybrid lens projection.

In another related aspect, methods, systems, and apparatus for seamlessly transitioning between lens projections are disclosed.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer-readable apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

In another embodiment of the foregoing non-transitory computer-readable apparatus, the non-transitory computer-readable apparatus includes a storage medium, the storage medium including a plurality of instructions configured to, when executed by a processor apparatus, cause a computerized apparatus to at least: obtain spherical content; and generate a projection of the spherical content based at least on a lens projection, the lens projection associated with at least a first lens curvature function, a second lens curvature function, and a third lens curvature function, the third lens curvature function providing a transition between respective aspects associated with the first and second lens curvature functions.

In one variant, the plurality of instructions are further configured to, when executed by the processor apparatus, cause the computerized apparatus to modify at least one dimension of the projection.

In a further variant, the first lens curvature function is based on a polynomial function over a first range of fields of view; the second lens curvature function is based on a trigonometric function over a second range of fields of view; and the first and second lens curvature function are based on a physical limitation of a lens.

In yet another variant, the third lens curvature function includes a virtualized lens curvature function not based on the physical limitation of the lens.

In another variant, the respective aspects associated with the first and second lens curvature functions include respective first and second slopes associated with the first and second lens curvature functions, the first and second slopes being different; and the plurality of instructions are further configured to, when executed by the processor apparatus, cause the computerized apparatus to dynamically determine an intermediary lens curvature function based at least on the first and second slopes, the intermediary lens curvature function including the third lens curvature function.

In still another variant, the spherical content includes a stitch of a plurality of images and one or more overlapping regions corresponding to the plurality of images, the plurality of images obtained via a plurality of image-capture apparatus.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings.

All Figures disclosed herein are © Copyright 2019-2020 GoPro, Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Lens Definition, Lens Polynomials

Typical camera lenses are constructed from glass, plastic, crystal, or similar transparent media. The lens curvature (in combination with the material index of refraction) defines the lens' optical light bending characteristics e.g., focal length, maximum aperture size, etc. As a practical matter, different lens manufacturers provide lens curvature information to describe the lens behavior; e.g., camera enthusiasts can use the lens definition to achieve different types of photographic capture, device manufacturers can "spec" devices according to lens definition, etc.

Historically, lens manufacturers have described lens curvature with an ideal polynomial over a specified range (plus or minus manufacturing tolerances). Polynomial-based lens definitions are particularly well suited for describing the physical behavior of bending light (for example, an ideal parabolic lens can be described with a polynomial of order two (2)). Notably, a lens is a physical object, thus lens definitions are range bounded to match the physical limitations of the lens. The lens polynomial is physically meaningless beyond the specified range and may describe impossible/undesirable light bending behaviors.

As an important related note, certain lens polynomials have acquired commercial importance. For example, the lens polynomial used in action cameras manufactured by the Assignee hereof (such as the GoPro HERO™) have been consistently and exclusively used over multiple device generations. Years of branding investment and multimedia have also cemented an association between its distinctive image distortion (a function of the lens polynomial) and the Assignee's action cameras, within the consuming public.

Emerging Use Cases: Wide Angle Field of View

Modern image editing techniques enable the creation of new types of media and/or photographic capabilities. In particular, multiple images can be edited together so as to create a picture that would be impossible to capture otherwise. For example, an action camera can capture two (2) hyper-hemispherical images using two fisheye cameras arranged in a back-to-back configuration. Each hyper-hemispherical lens captures a FOV of greater than a hemisphere (e.g., on the order of 190°). The hyper-hemispherical images can be stitched together to create a complete 360° spherical image (i.e., this is physically impossible to replicate with a single lens camera).

Digital post-processing can also enable aesthetically pleasing shots even under sub-optimal framing and/or shooting conditions. For example, a 360° spherical image can be cropped to any arbitrary "window" to focus on a particular object of interest (which may be in any arbitrary location); e.g., the 360° spherical image can be cropped to focus on an object caught in the periphery of both hyper-hemispherical images. Notably, this greatly facilitates filming in situations where e.g., the object of interest is unpredictably located/moving, or where the camera operator is moving (and unable to properly frame the shot.)

In addition to stitching and cropping, digital image processing has also been used to emulate lens curvature effects to e.g., achieve a desired aesthetic perspective. For example, spherical image content can be re-projected to generate video for viewing on a smart phone, laptop, or other media playback device (e.g., such as is described in co-owned and co-pending U.S. patent application Ser. No. 16/572,383 filed Sep. 16, 2019 and entitled "METHODS AND APPARATUS FOR MAXIMIZING CODEC BANDWIDTH IN VIDEO APPLICATIONS," incorporated herein by reference in its entirety). One commercially important device implementation uses 5.6K@30 fps 360° video content to generate 120° panoramic videos in any direction at a resolution of 1920× 1080 (1080p, also commonly referred to as High Definition (HD)). In one specific implementation, a virtualized physical lens curvature is added in post-processing to provide the visual "feel" of viewing the action through a physical camera lens.

Notably, in the digital domain, virtualized lens curvatures are not physically constrained; thus, virtualized lens curvatures can be unbound over any range, etc. One particularly important virtualized lens curvature is the "stereographic" curvature which is based on a trigonometric definition (instead of polynomials). Specifically, stereographic lens curvatures use the arctangent function, which asymptotically approaches 180° at infinity. In common parlance, stereographically projected 360° panoramas may also be referred to as "little planet" projections.

Example Operation—

Figure 1:
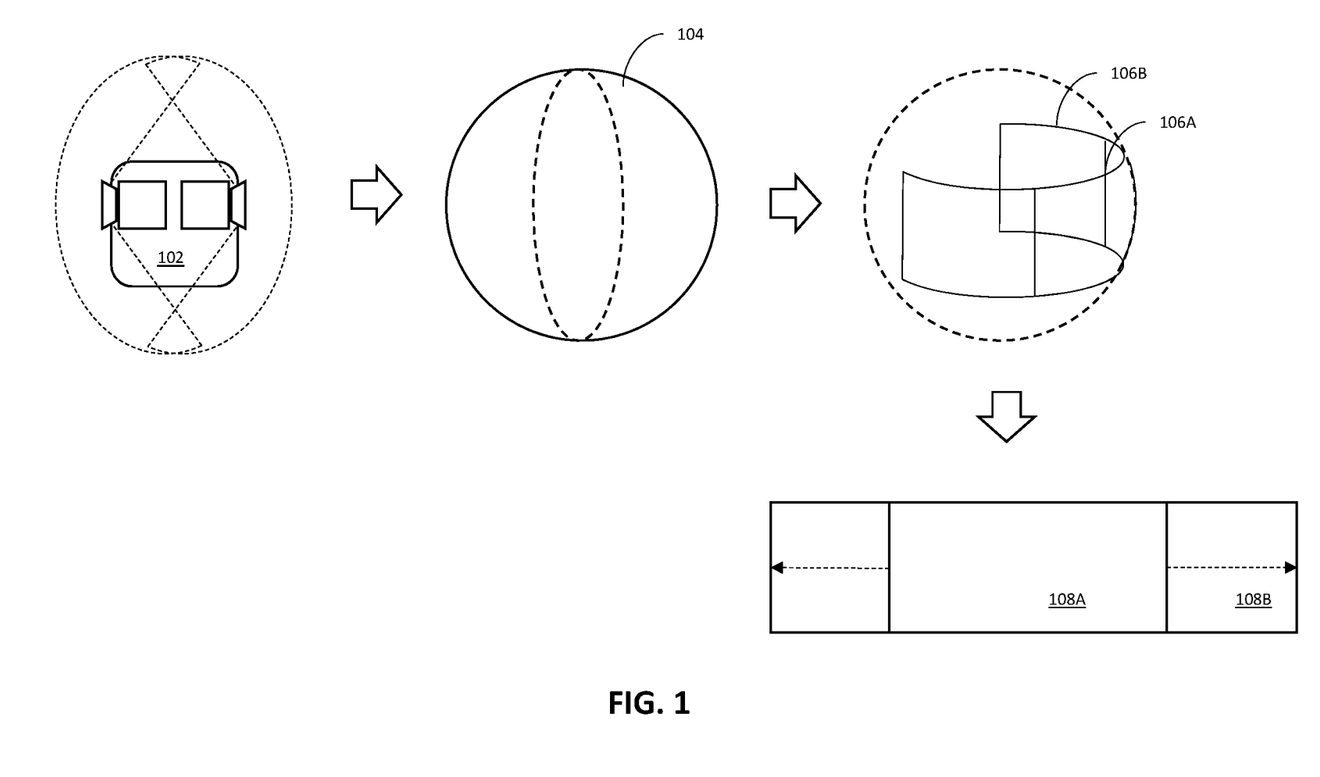
FIG. 1 is a logical block diagram of one exemplary image capture and post-processing scenario, useful for illustrating various aspects of the present disclosure.

As shown in FIG. 1, an action camera 102 captures two (2) hyper-hemispherical images with overlapping regions. The action camera 102 stitches together a single spherical projection 104 based on the overlapping regions. Consider the situation where a user wants to create a video that starts in a polynomial-based lens projection in a first field of view (FOV) 106A, 108A, but "pulls back" to a second FOV using a trigonometric virtual lens 106B, 108B.

Unfortunately, simply switching between the polynomial-based lens projection and the trigonometric lens projection results in sharp image and motion artifacts as objects "snap" into the new projection; these artifacts are easily perceptible and undesirable. Consequently, techniques for imperceptibly transitioning between lens projections are needed.

In one embodiment, a piecewise lens projection is created from the polynomial-based lens projection and the trigonometric lens projection. Specifically, the polynomial-based lens projection is used for the first field of view (FOV) range, and the trigonometric lens projection is used for the second FOV range. Notably, differences in the "slope" (rate of change as a function of FOV) between lens projections may introduce subtle image artifacts and/or result in non-linear motion artifacts. While these artifacts are less noticeable than the aforementioned "snapping", nonetheless the effect may be undesirable. Consequently, as a further improvement, the piecewise lens projection may include one or more intermediate "joining" lens projections.

Figure 2:
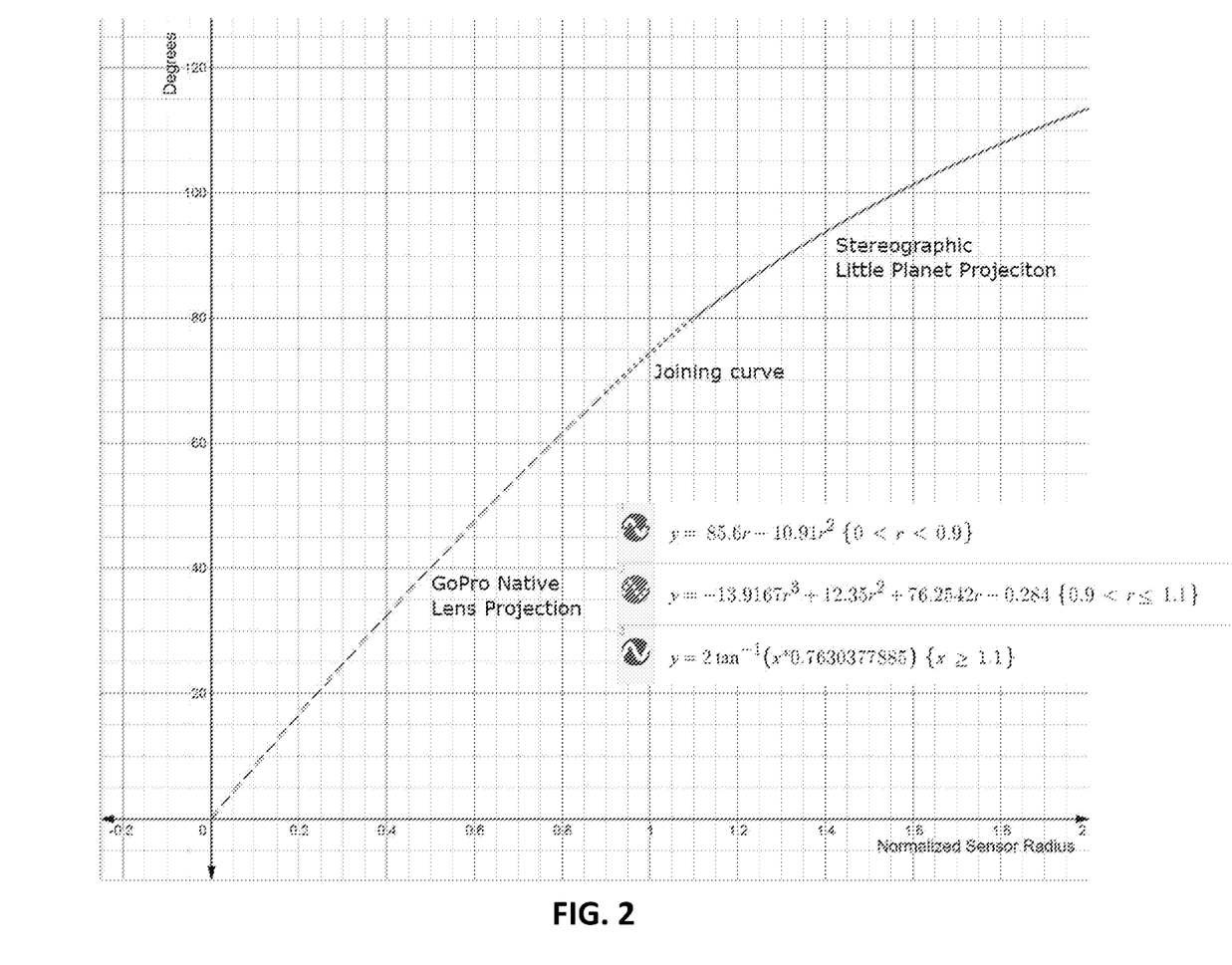
FIGS. 2-3 are graphical plots of an exemplary piecewise lens definition, in accordance with the various principles of the present disclosure.
Figure 3:
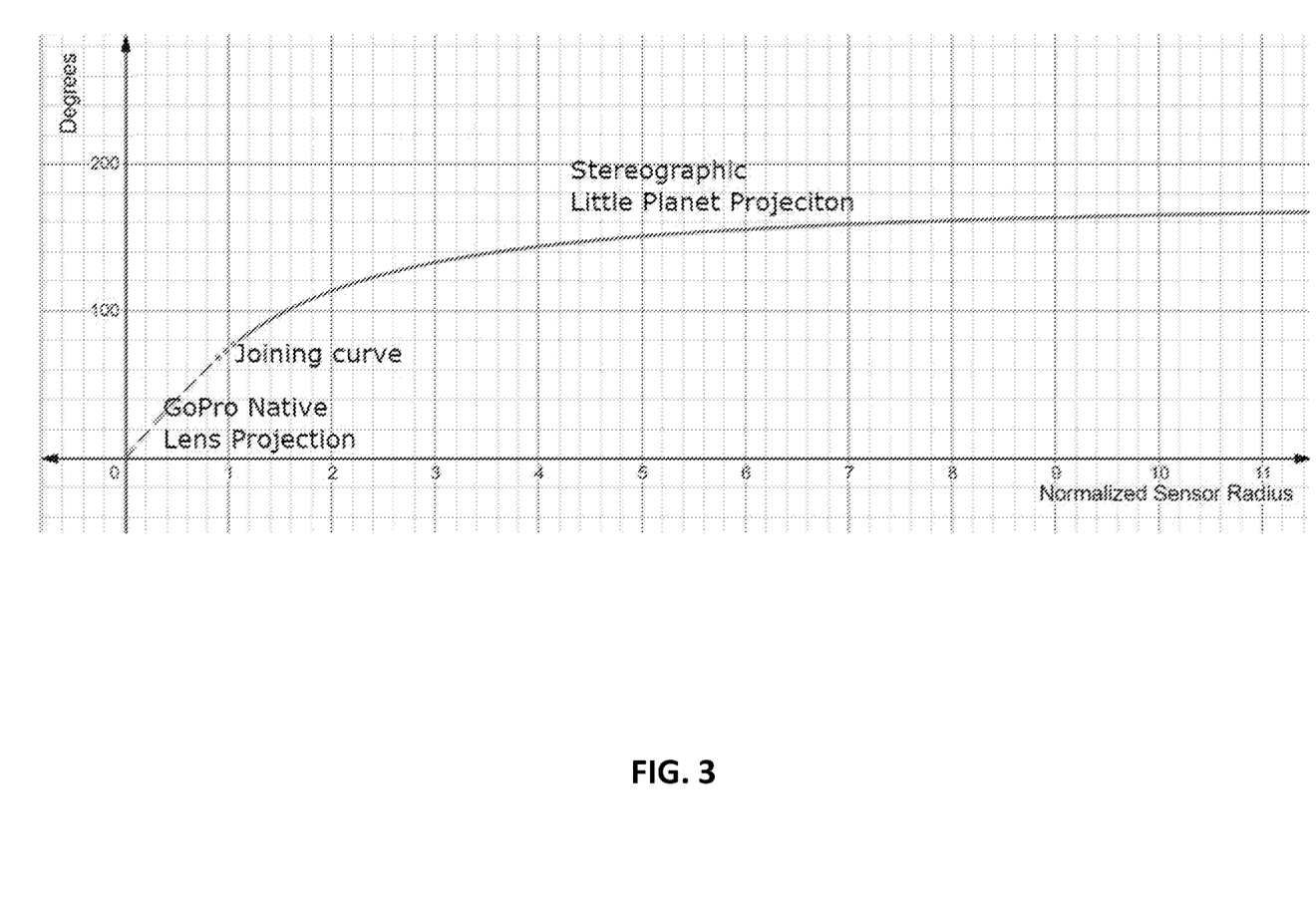

Referring now to FIG. 2, one exemplary piecewise lens projection consistent with the various principles described herein is shown. As shown therein, the exemplary piecewise lens projection is composed of three (3) functions: (i) a first polynomial-based lens projection ("GoPro Native Lens Projection"), (ii) a second "joining" lens projection, and (iii) a trigonometric lens projection ("Stereographic Little Planet Projection"). The piecewise lens projection defines virtual lens behavior as a function of normalized sensor radius and FOV degrees. Furthermore, as illustrated in FIG. 3, the piecewise lens projection provides the dual benefits of: (i) enabling the commercially important lens projection for the relevant FOV range, while still scaling infinitely (e.g., the projection asymptotically approaches a 180° FOV at infinity).

During image processing, the piecewise lens projection can be used to determine the appropriate distortion as a function of FOV. In this manner, a user can select (or have as a default setting) the polynomial-based lens projection, and dynamically change the FOV without regard to the limitations thereof. More directly, the piecewise lens projection enables seamless transitions between lens projections across any FOV.

Exemplary Methods—

Figure 4:
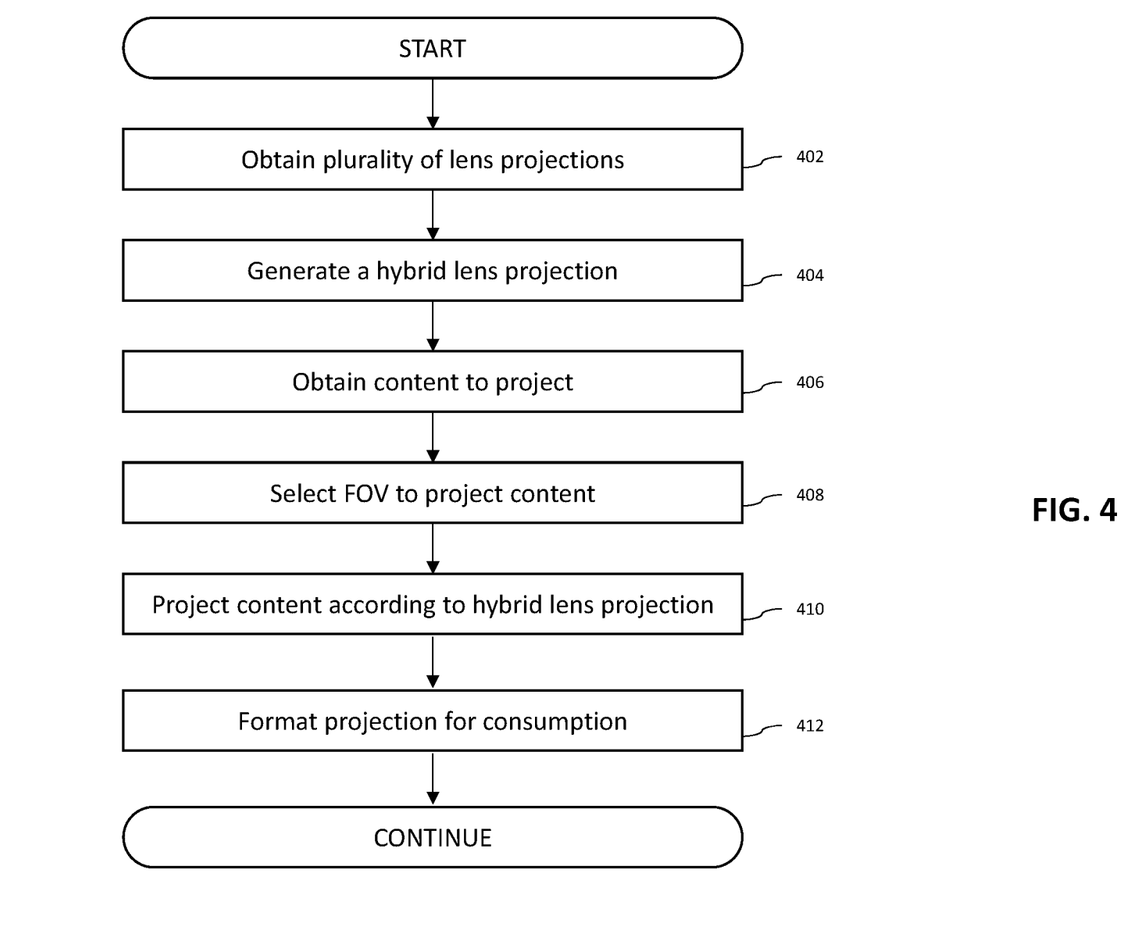
FIG. 4 is a logical flow diagram of one exemplary method for seamlessly transitioning between lens projections, in accordance with the various principles of the present disclosure.

FIG. 4 is a logical flow diagram of one exemplary method to seamlessly transition between lens projections.

At step 402 of the method, a plurality of lens projections is obtained. In one embodiment, the lens projections may be polynomial-based, trigonometric, or any other mathematical definition. In one exemplary embodiment, the lens projections may be associated with a field of view (FOV).

At step 404 of the method, a hybrid lens projection is generated to transition between the plurality of lens projections. In one embodiment, the hybrid lens projection may be a piecewise lens projection as a function of field of view. In one embodiment, the piecewise lens projection includes at least a first lens projection and a second lens projection. In one exemplary variant, the piecewise lens projection further includes one or more intermediary lens projections.

In one variant, the one or more intermediary lens projections may be pre-defined based on known adjacent lens projections. In other variants, the one or more intermediary lens projections may be dynamically determined by smoothing between the slope of two adjacent lens projections. In still other variants, the one or more intermediary lens projections may be user selectable (or otherwise configurable).

At step 406 of the method, image content is obtained for projection. In one embodiment, the image content is spherical content captured via a multiple camera system (e.g., an action camera or other panoramic camera). In some embodiments, the image data is a video. In other embodiments, the image data is one or more panoramic images.

At step 408 of the method, a field of view (FOV) is selected within the image content. In one embodiment, the FOV may dynamically change. For example, the FOV may increase or decrease. In other embodiments, a range bound lens curvature is used within a wider overall FOV.

At step 410 of the method, the content is projected in accordance with a hybrid lens definition and the field of view (FOV). In one embodiment, the content is stretched or shrunk in one or more dimensions in accordance with the hybrid lens projection. In one exemplary embodiment, the content is projected via a mobile device (e.g., a smart phone, laptop, etc.) In one embodiment, the content may be projected via an action camera.

At step 412 of the method, the projection is formatted for consumption. In one embodiment, the projection is displayed via a mobile device user interface (e.g., a smart phone, laptop, etc.). In other embodiments, the projection is encoded for transfer via e.g., a commodity codec chain.

Apparatus

Figure 5:
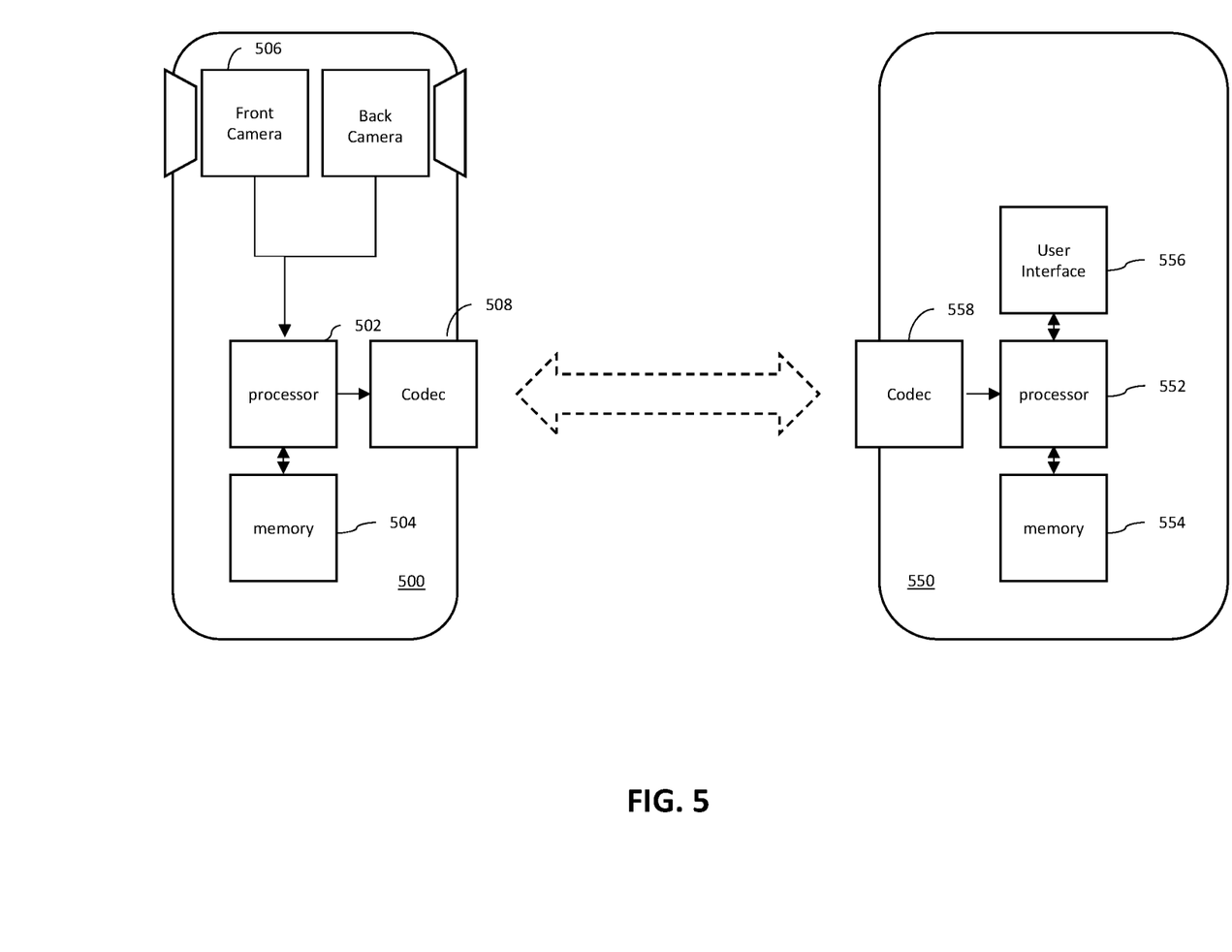
FIG. 5 is a logical block diagram of apparatus, useful in conjunction with the various aspects of the present disclosure.

FIG. 5 is a logical block diagram of an action camera 500 in data communication with a smart phone 550, useful to illustrate various aspects of the present disclosure. While the illustrated embodiment is presented in the context of two (2) devices, the various techniques described herein may be performed by either in isolation.

In one exemplary embodiment, the action camera 500 includes a processor 502, a non-transitory computer readable medium 504, one or more cameras 506, and a codec and/or other data interface 508.

In one exemplary embodiment, the smart phone 550 includes a processor 552, a non-transitory computer readable medium 554, user interface 556, and a codec and/or other data interface 558.

Additional Configuration Considerations—

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, Ruby, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like, as well as taking the form of containerized applications and environments such as Docker, and VMs and associated hypervisors.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, (G)DDR/2/3/4/5/6 SDRAM, EDO/FPMS, RLDRAM, SRAM, "flash" memory (e.g., NAND/NOR), memristor memory, and PSRAM.

As used herein, the term "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), GPUs, array processors, secure microprocessors, application-specific integrated circuits (ASICs), and/or other digital processing devices. Such digital processors may be contained on a single unitary IC die, or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus comprising:
a processor apparatus;
a first image-capture apparatus and a second image-capture apparatus each configured to communicate digital data with the processor apparatus; and
a non-transitory computer-readable apparatus comprising a storage medium, the storage medium comprising a plurality of instructions configured to, when executed by the processor apparatus, cause the computerized apparatus to at least:
cause a first image to be captured via the first image-capture apparatus;
cause a second image to be captured via the second image-capture apparatus;
using at least portions of the first image and second image, produce spherical image content associated with a first lens projection and a second lens projection;
determine a hybrid lens projection configured to transition between the first and second lens projections; and
generate an image projection of the spherical image content based at least on the determined hybrid lens projection.

2. The computerized apparatus of claim 1, wherein the plurality of instructions are further configured to, when executed by the processor apparatus, cause the computerized apparatus to at least:
determine a field of view associated with the image projection of the spherical image content;
wherein the generation of the image projection of the spherical image content is further based at least on the determined field of view.

3. The computerized apparatus of claim 2, wherein the plurality of instructions are further configured to, when executed by the processor apparatus, cause the computerized apparatus to at least:
enable a user of the computerized apparatus to select one of the first lens projection or the second lens projection;
wherein the generation of the image projection of the spherical image content is further based at least on the selection of the first or second lens projection.

4. The computerized apparatus of claim 3, wherein:
the field of view is configured to be dynamically modified; and
the generation of the image projection of the spherical image content is further based at least on the dynamic modification of the field of view.

5. The computerized apparatus of claim 1, wherein:
the first lens projection is based on a polynomial-based function; and
the second lens projection is based on a trigonometric-based function.

6. The computerized apparatus of claim 1, wherein:
the first image captured via the first image-capture apparatus comprises a first hyper-hemispherical image;
the second image captured via the second image-capture apparatus comprises a second hyper-hemispherical image; and
the first and second hyper-hemispherical images comprise one or more overlapping regions with respect to each other.

7. The computerized apparatus of claim 1, wherein the hybrid lens projection comprises a third lens projection that is different from the first and second lens projections, the third lens projection being configured to provide a transition between a slope associated with the first lens projection and a slope associated with the second lens projection, the transition being configured to create fewer image artifacts within the image projection of the spherical image content as compared to an image projection without the hybrid lens projection.

8. A non-transitory computer-readable apparatus comprising a storage medium, the storage medium comprising a plurality of instructions configured to, when executed by a processor apparatus, cause a computerized apparatus to at least:
obtain spherical content; and
generate a projection of the spherical content based at least on a lens projection, the lens projection associated with at least a first lens curvature function, a second lens curvature function, and a third lens curvature function, the third lens curvature function providing a transition between respective aspects associated with the first and second lens curvature functions.

9. The non-transitory computer-readable apparatus of claim 8, wherein the plurality of instructions are further configured to, when executed by the processor apparatus, cause the computerized apparatus to modify at least one dimension of the projection.

10. The non-transitory computer-readable apparatus of claim 8, wherein:
the first lens curvature function is based on a polynomial function over a first range of fields of view;
the second lens curvature function is based on a trigonometric function over a second range of fields of view; and
the first and second lens curvature function are based on a physical limitation of a lens.

11. The non-transitory computer-readable apparatus of claim 10, wherein the third lens curvature function comprises a virtualized lens curvature function not based on the physical limitation of the lens.

12. The non-transitory computer-readable apparatus of claim 8, wherein:
the respective aspects associated with the first and second lens curvature functions comprise respective first and second slopes associated with the first and second lens curvature functions, the first and second slopes being different; and
the plurality of instructions are further configured to, when executed by the processor apparatus, cause the computerized apparatus to dynamically determine an intermediary lens curvature function based at least on the first and second slopes, the intermediary lens curvature function comprising the third lens curvature function.

13. The non-transitory computer-readable apparatus of claim 8, wherein the spherical content comprises an algorithmic stitch of a plurality of images and one or more overlapping regions corresponding to the plurality of images, the plurality of images obtained via a plurality of image-capture apparatus.

14. A method for seamlessly transitioning between lens projections, the method comprising:
causing a first image to be captured via a first image-capture apparatus;
causing a second image to be captured via a second image-capture apparatus;
producing spherical image content associated with a first lens projection and a second lens projection using at least portions of the first image and second image;
determining a hybrid lens projection configured to transition between the first and second lens projections; and
generating an image projection of the spherical image content based at least on the determined hybrid lens projection.

15. The method of claim 14, further comprising determining a field of view associated with the image projection of the spherical image content, wherein the generating of the image projection of the spherical image content is further based at least on the determined field of view.

16. The method of claim 15, further comprising enabling a user to select one of the first lens projection or the second lens projection, wherein the generating the image projection of the spherical image content is further based at least on the selection of the first or second lens projection.

17. The method of claim 16, wherein:
the field of view is configured to be dynamically modified; and
the generating the image projection of the spherical image content is further based at least on the dynamic modification of the field of view.

18. The method of claim 14, wherein:
the first lens projection is based on a polynomial-based function; and
the second lens projection is based on a trigonometric-based function.

19. The method of claim 14, wherein:
the first image captured via the first image-capture apparatus comprises a first hyper-hemispherical image;
the second image captured via the second image-capture apparatus comprises a second hyper-hemispherical image; and
the first and second hyper-hemispherical images comprise one or more overlapping regions with respect to each other.

20. The method of claim 14, wherein the hybrid lens projection comprises a third lens projection that is different from the first and second lens projections, the third lens projection being configured to provide a transition between a slope associated with the first lens projection and a slope associated with the second lens projection, the transition being configured to create fewer image artifacts within the image projection of the spherical image content as compared to an image projection without the hybrid lens projection.

\* \* \* \* \*